(12) United States Patent
Robertson et al.

(10) Patent No.: US 7,739,139 B2
(45) Date of Patent: Jun. 15, 2010

(54) SOCIAL NETWORKING SYSTEM

(75) Inventors: Brian D. Robertson, Boston, MA (US); Warren W. Adams, Edgartown, MA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 12/127,495

(22) Filed: May 27, 2008

(65) Prior Publication Data

US 2008/0228887 A1 Sep. 18, 2008

Related U.S. Application Data

(60) Continuation of application No. 11/022,089, filed on Dec. 22, 2004, now Pat. No. 7,386,464, which is a division of application No. 10/780,486, filed on Feb. 17, 2004, now Pat. No. 7,194,419, which is a continuation of application No. 09/348,355, filed on Jul. 7, 1999, now Pat. No. 6,714,916, which is a continuation of application No. 08/962,997, filed on Nov. 2, 1997, now Pat. No. 6,269,369.

(51) Int. Cl.
G06F 9/44 (2006.01)

(52) U.S. Cl. .......................................... 705/9
(58) Field of Classification Search .................. 705/9
See application file for complete search history.

(56) References Cited

U.S. PATENT DOCUMENTS 4,626,836 A 12/1986 Curtis et al.
4,862,357 A 8/1989 Ahlstrom et al.
5,086,394 A * 2/1992 Shapira .......................... 705/1
5,263,160 A 11/1993 Porter, Jr. et al.
5,276,901 A 1/1994 Howell et al.
5,459,859 A 10/1995 Senda
5,539,813 A 7/1996 Jonsson et al.
5,796,995 A 3/1997 De Hond
5,737,726 A 4/1998 Cameron et al.
5,794,210 A 8/1998 Goldhaber et al.
5,831,611 A 11/1998 Kennedy et al.
5,835,087 A 11/1998 Herz et al.

(Continued)

FOREIGN PATENT DOCUMENTS

JP 405108902 A 4/1993

OTHER PUBLICATIONS

Wellman (For A Social Network Analysis of Computer Networks), Jan. 1996, ACM, pp. 1-11.*

(Continued)

Primary Examiner—Romain Jeanty
(74) Attorney, Agent, or Firm—Knobbe, Martens, Olson & Bear LLP

(57) ABSTRACT

A networked computer system provides various services for assisting users in locating, and establishing contact relationships with, other users. For example, in one embodiment, users can identify other users based on their affiliations with particular schools or other organizations. The system also provides a mechanism for a user to selectively establish contact relationships or connections with other users, and to grant permissions for such other users to view personal information of the user. The system may also include features for enabling users to identify contacts of their respective contacts. In addition, the system may automatically notify users of personal information updates made by their respective contacts.

25 Claims, 14 Drawing Sheets

U.S. PATENT DOCUMENTS

| | | | |
|---|---|---|---|
| 5,848,395 | A | 12/1998 | Edgar et al. |
| 5,948,040 | A | 9/1999 | Delorme et al. |
| 6,049,796 | A | 4/2000 | Siitonen et al. |
| 6,070,160 | A | 5/2000 | Geary |
| 6,092,088 | A | 7/2000 | Takeda |
| 6,175,831 | B1 | 1/2001 | Weinreich et al. |
| 6,269,369 | B1 | 7/2001 | Robertson et al. |
| 6,460,036 | B1 | 10/2002 | Herz |
| 6,714,916 | B1 | 3/2004 | Robertson et al. |
| 7,194,419 | B2 | 3/2007 | Robertson et al. |

OTHER PUBLICATIONS

Kautz et al (ReferralWeb: Combining Social Networks and Collaborating Filtering), Mar. 1997, Communication of the ACM, vol. 40 No. 3, pp. 1-4.*

"*1997 Edition GS Lotus Organizer/Exploring Organizer/Windows 95 edition*," pp. iii-vii and 8-1-8-6.

"*Applications Handbook For the Palm III ™Organizer*," 3Com, pp. iii-v, and 1-12 (Apr. 1998).

"*Symantec ACT! User's Guide and Reference, Version 2.0 For Windows*," pp. ix-xvi and 3-11-3-26.

"*Information about Lotus Notes from the Lotus Web Site* (www.Lotus.com), " pp. 1-13 (Apr. 1998).

"*Domino 4.6 Features Overview*," Jul. 1997, 2 pages, www.lotus.com/domino.

"*Yahoo! White Pages*," Copyright 1994-1998, Yahoo!, http://www.yahoo.com/.

"*WhoWhere?*," Copyright 1995-1998, Who/Where? Inc., http://www.whowhere.com/.

R. Tamura, et al., "*Lotus Notes 4*," pp. 39, 64-65, and 176 (1996).

Cardwell, "*Cyberscene Planet Keeps You in Touch*," Dec. 1996, Boston Herald Boston.

Day, "*New Software Tracks Corporate Travel Plans*," Jan. 1991, Denver Post (Denver, CO,US), V99 N153 sC p2, Dialog File 63 Accession No. 0187621.

Wetzel, "*Municipally-owned venues feel brunt of city budget cuts*," Aug. 1991, Amusement Business, v103, n31, p3(3), Dialog File 148, Accession No. 05427255.

"*Should manufacturers try to establish rapport with their agents' other principals*," Mar. 1995, Agency Sales Magazine v25n3, pp. 13-15, Dialog File 15, Accession No. 00988855.

Smith, "*Companies Meet Each Other at the Airport*," Jul. 1995, The Los Angeles Times, ISSN: 04583035.

Gerety, "*Whose Job Is It Anyway?; Meetings As a Subset of Travel: Yes or No?*," Apr. 1992, Business Travel News, ISSN: 8750-3670.

Brisson, et al., "*Lifeco Puts Pre-Trip Control in Travel Managers' Hands*," Mar. 1991, Business Travel News, ISSN: 8750-3670.

"*PlanetAll plans to Make a World of Difference in Busy Lives*," Nov. 1996, PR Newswire, pp. 1113NEW025.

"*Fall Internet World '96 Exhibitor Previews*," Dec. 3, 1996, Business Wire, p. 12030220, Dialog File 16, Accession No. 04716024.

Answer and Second Amended Counterclaims of Defendant Amazon.com, Inc. in Cordance Corporation v. Amazon.com, Inc. (C.A. No. 06-491-MPT).

* cited by examiner

*560*

PSEUDO REGISTRATION FORM

| Name | ☐ 560-2 |
| HomeAddress | ☐ 560-4 |
| Home Phone | ☐ 560-6 |
| Work Address | ☐ 560-8 |
| Work Phone | ☐ 560-10 |
| Birthday | ☐ 560-12 |
| Your High School | ☐ 560-14 |

560-16 Year of Enrollment ☐    560-18 Graduation Year ☐

560-20 Your College ☐

560-22 Year of Enrollment ☐    560-24 Graduation Year ☐

560-26 (Submit)

*FIG. 7*

PSEUDO GROUP LIST FORM
580-2
Following are the other members who went to your college at about the same time.
580-4
Click on the boxes next to the names of the people you'd like to add to your Address Book.
580-6
State University, 1982-1986
580-14  580-10  580-12
 John Doe (Graduated 1985)
 Robert Johnson (Graduated 1986)
 Jane Smith (Graduated 1986)
580-16
 Submit
FIG. 8

600

PSEUDO PERMISSION FORM 600-2
Click on the boxes next to the Permission Levels that you would like to grant to your new contact 600-4
John Doe 600-7 ☒ Crossing Paths Notification Permission 600-6

600-9 ☐ Personal Information 600-8

☒ Work Information 600-10

☒ Birthday Notification 600-12

☒ Friend of Friends Information 600-14

600-16 ( Submit )

PSEUDO MEMBER UPDATE

Member Update — 650-2
December 7, 1998

650-4

The following of your contacts have upcoming birthdays:
- Avery Rogers (Dec. 11)  ⎱ 650-6
- Jane Bigelow (Dec. 14)  ⎰

650-8

Your contacts have registered the following address changes:
- Tom Kohn

New work address:
    1000 Wilson Boulevard   ⎱ 650-10
    Arlington, Va 22229     ⎰

New work phone:   ⎱ 650-12
    703-558-3312      ⎰

650-14

The following new members have affiliated with the same groups as you:
- Gary Clayton (State College, 1985)   — 650-16

650-18

The following members have linked to you and have requested that you reciprocate:
- Jun Ohama    ⎱ 650-20
- Lee Rogers   ⎰

650-22

You have scheduled a trip to Phoenix on December 14. The following of your contacts live in Phoenix or will be in Phoenix on that date:
- Andrew Kress   ⎱ 650-24
- Taylor Pierce  ⎰

650-26

According to Astrology, the following of your contacts are compatible with you today (Libras)
- Bryan Jamieson   ⎱ 650-28
- Anne Thierry     ⎰

*FIG. 11*

PSEUDO CROSSING PATH LIST — 670

670-2 — The following of your contacts will be in Chicago while you are there.

670-4 — Check the boxes next to their names if you would like to inform them that you will be visiting Chicago.

People Who Live in Chicago — 670-6
☐ Scott Ullem
☐ Taylor Pierce
☐ Betsy Klein

People Who Will be Visiting Chicago — 670-8
☐ Tania Gutsche 670-10 — Submit

PSEUDO ADD TRAVEL FORM — 660

Traveling To City: — 660-2
660-4
State: — 660-6
Country: — 660-8
Arrive in City on Date: — 660-10
Leave City on Date: — 660-20
How to get in touch while in this City:

FIG. 12

SOCIAL NETWORKING SYSTEM

RELATED APPLICATIONS

This application is a continuation of U.S. application Ser. No. 11/022,089, filed Dec. 22, 2004, now U.S. Pat. No. 7,386,464 which is a division of U.S. patent application Ser. No. 10/780,486, filed Feb. 17, 2004, now U.S. Pat. No. 7,194,419 which is a continuation of U.S. patent application Ser. No. 09/348,355, filed Jul. 7, 1999 (now U.S. Pat. No. 6,714,916), which is a continuation of U.S. application Ser. No. 08/962,997, filed Nov. 2, 1997 (now U.S. Pat. No. 6,269,369).

BACKGROUND OF THE INVENTION

1. Field of the Invention

The present invention relates generally to multi-user computer systems, such as contact management systems, that provide services for users to locate and share personal information with other users.

2. Description of Related Art

Several types of prior art for managing contact information exist, including Personal Information Management software applications, Groupware Applications, and Internet-based "White Pages" and e-mail services.

Personal Information Management Software. As represented generally in FIG. 1, in a typical prior art Personal Information Management (PIM) software application (e.g., Lotus Organizer, Microsoft Outlook, or U.S. Robotics Palm Pilot), a PIM software application 120, 124 that stores contact information in a database resides on a workstation or handheld computer 100 having a central processing unit 102, a display 108, a keyboard and/or mouse 110, a primary memory 104 (e.g., random access memory) for program execution, a secondary memory 106 (e.g., a hard disc) for program storage, and peripheral devices 112. As is well known, programs, such as the PIM software 120, are executed in the RAM 104 by the CPU 102 under control of the operating system software 122, 126.

In the prior art, users themselves enter the contact information that they want to store in the PIM software. A variety of methods exist for entering this contact information. It may be entered manually using the keyboard, imported from an existing file on their computer, or imported via a peripheral device such as a business card scanner. The defining characteristic of this class of prior art is that the input of the contact information is performed by the user of the software and, when the information changes, the user must modify the information himself. What this class of prior art lacks is a means for information to be shared between multiple users and a means for a given user to post changes to his own information for the benefit of others.

Groupware Applications. As generally represented in FIG. 2, in a typical prior art Groupware application (e.g., Lotus Notes), a user workstation 160 accesses information stored on a central server computer 130 over a computer network 150, such as a Local Area Network or Intranet. The server system consists of a central processing unit 132, a primary memory 134 (e.g., random access memory) for program execution, a secondary storage device 136 (e.g., a hard disc) for program storage, and a modem 138 or other device for connecting to the computer network. The user workstation 160 is the same as the user workstation 100 described in reference to FIG. 1 with the addition of a modem 162 or other device for connecting to the computer network. The file server or database contains data files 148 that can be accessed only by authorized users. The user uses client software 174, 176 running on the user workstation 160 to access the files 148 under the mediation of server software 140, 144 running on the server 130.

Typically, in such a system a central system administrator organizes users into classes and the creator of a file 148 determines what classes of users may view the file. The rules governing which individual users or classes of users have the authorization to view a particular file 148 may be stored as part of the file itself. Alternatively, these rules are based upon the hierarchical directory structure of the file server in which the file is stored. That is, a particular user may view files in one directory but not another.

FIG. 3 represents a common deployment of a contact management system based on Groupware. Each user enters information 202 about himself and specifies a set of permissions 204 that define what classes of users are able to view various pieces of the information 202. What this deployment of the prior art lacks is the ability to authorize viewing privileges on a user-by-user basis rather than on a class-by-class basis. For instance, a user would be able to grant access to his home phone number 206 to the Human Resources department of his employer (e.g., Class A) while denying access to the same information to his co-workers (e.g., Class C). The user would not be able to give access to his home phone number selectively to a first co-worker while denying it to a second co-worker if both co-workers were part of the same class of users as organized by the central system administrator. Furthermore, such a system would lack a practical notification methodology. There would be no way for a user to specify "notify me when the first co-worker changes his information but not when the second co-worker changes his information."

Internet-Based "White Pages" and E-Mail Directory Services. In a typical prior art "white pages" or e-mail service, client computers and a server computer are connected via the World Wide Web as depicted in FIG. 4. A user subscribes to a White Pages or E-Mail service via a client computer 270 operating a web browser 282 or other software application residing in memory 274 that allows it to display information downloaded from a server computer 230 over the World Wide Web 260. The server computer system accesses a database 240 containing contact information entered by registered users. The service enables users to view contact information entered by other users. The authorization scheme may allow all users to limit certain classes of users from viewing certain parts of their user record as represented in FIG. 3. However, there are no linkages between individual users and thus users cannot restrict the viewing of their information on a user-by-user basis. Furthermore, users cannot be notified when information for particular users has changed.

SUMMARY

A networked computer system provides various services for assisting users in locating, and establishing contact relationships with, other users. For example, in one embodiment, users can identify other users based on their affiliations with particular schools or other organizations. The system also provides a mechanism for a user to selectively establish contact relationships or connections with other users, and to grant permissions for such other users to view personal information of the user. The system may also include features for enabling users to identify contacts of their respective contacts. In addition, the system may automatically notify users of personal information updates made by their respective contacts.

BRIEF DESCRIPTION OF THE DRAWINGS

The accompanying drawings, which are incorporated in and form a part of this specification, illustrate embodiments of the invention, wherein:

FIG. 7 represents a pseudo graphical user interface in which a user enters information in specific data fields to create a personal data record;

FIG. 8 represents a pseudo graphical user interface for listing other users with the same group affiliation as that specified by a first user;

FIG. 9 represents a pseudo graphical user interface for specifying what type of data fields from a first user's personal data record to which the first user wishes to grant a specific second user access;

FIG. 11 represents a pseudo graphical user interface that provides a first user with specific information that has changed about the other users to which the first user is linked;

FIG. 12 represents a pseudo graphical user interface that allows a first user to enter travel information and find out which contacts have overlapping travel schedules

DETAILED DESCRIPTION OF PREFERRED EMBODIMENTS

Reference will now be made in detail to the preferred embodiments of the invention, examples of which are illustrated in the accompanying figures. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
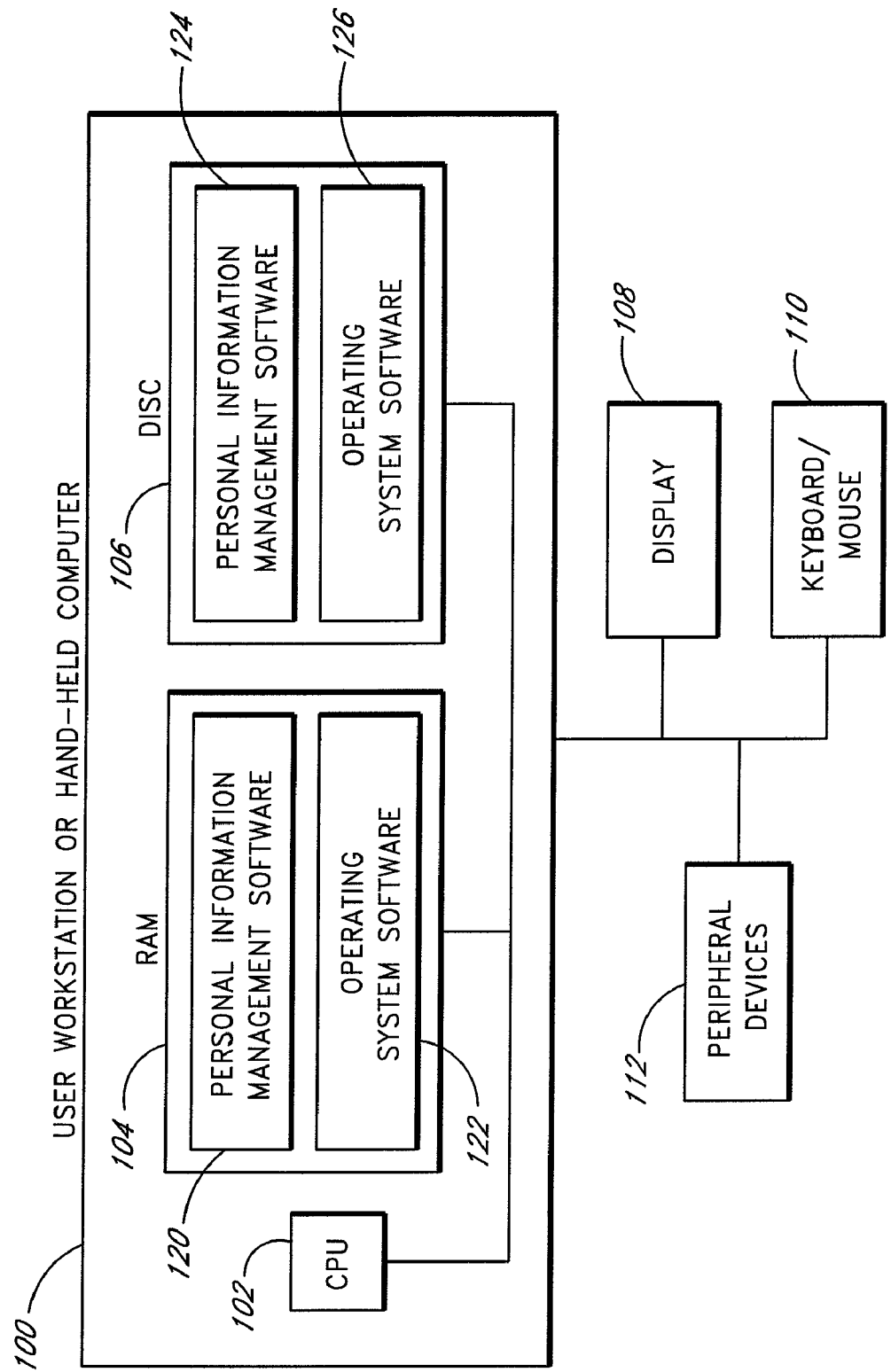
FIG. 1 depicts a computer loaded with Personal Information Management software.
Figure 2:
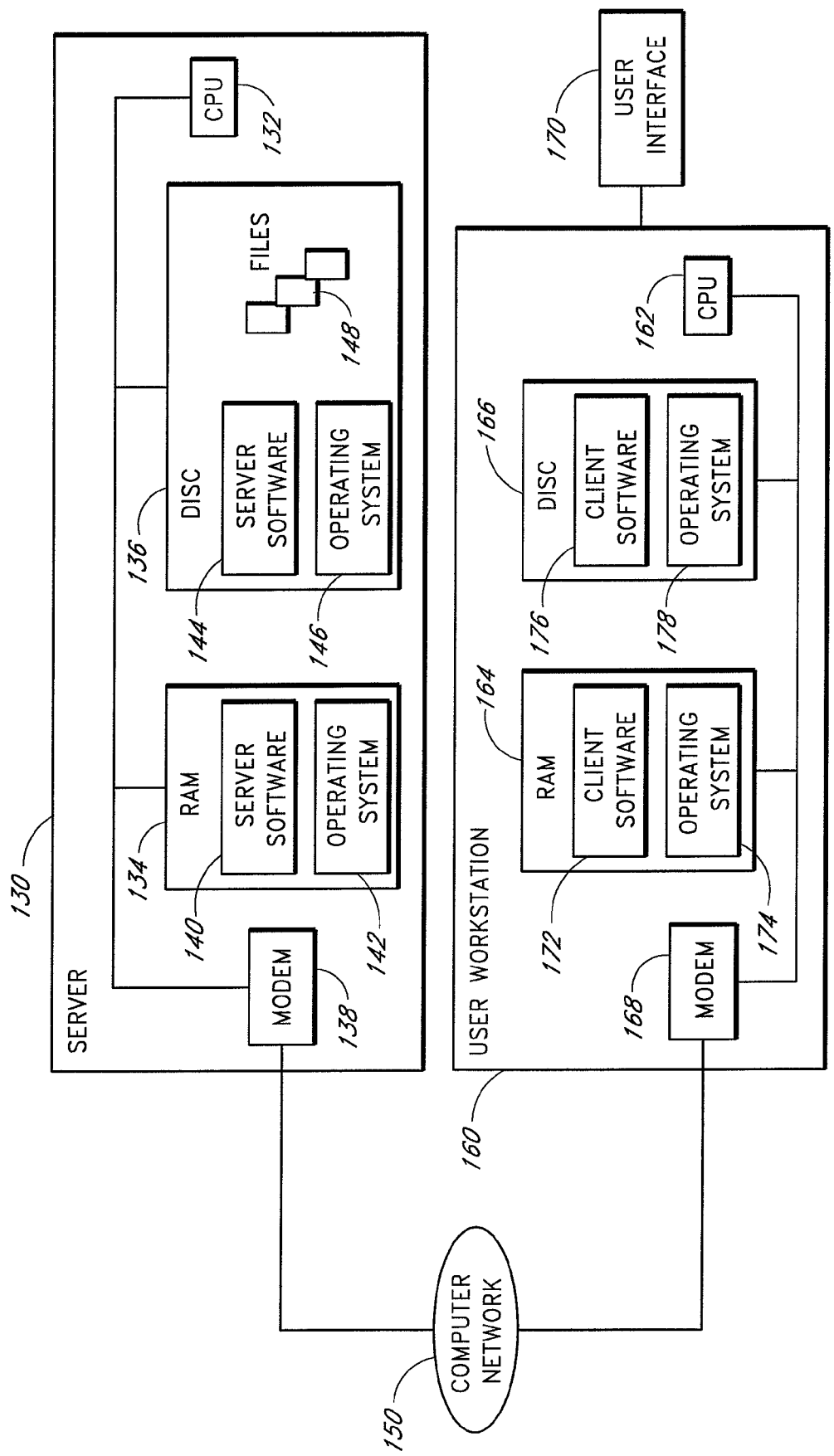
FIG. 2 generally depicts the data schema of a category of prior art known as groupware applications.
Figure 3:
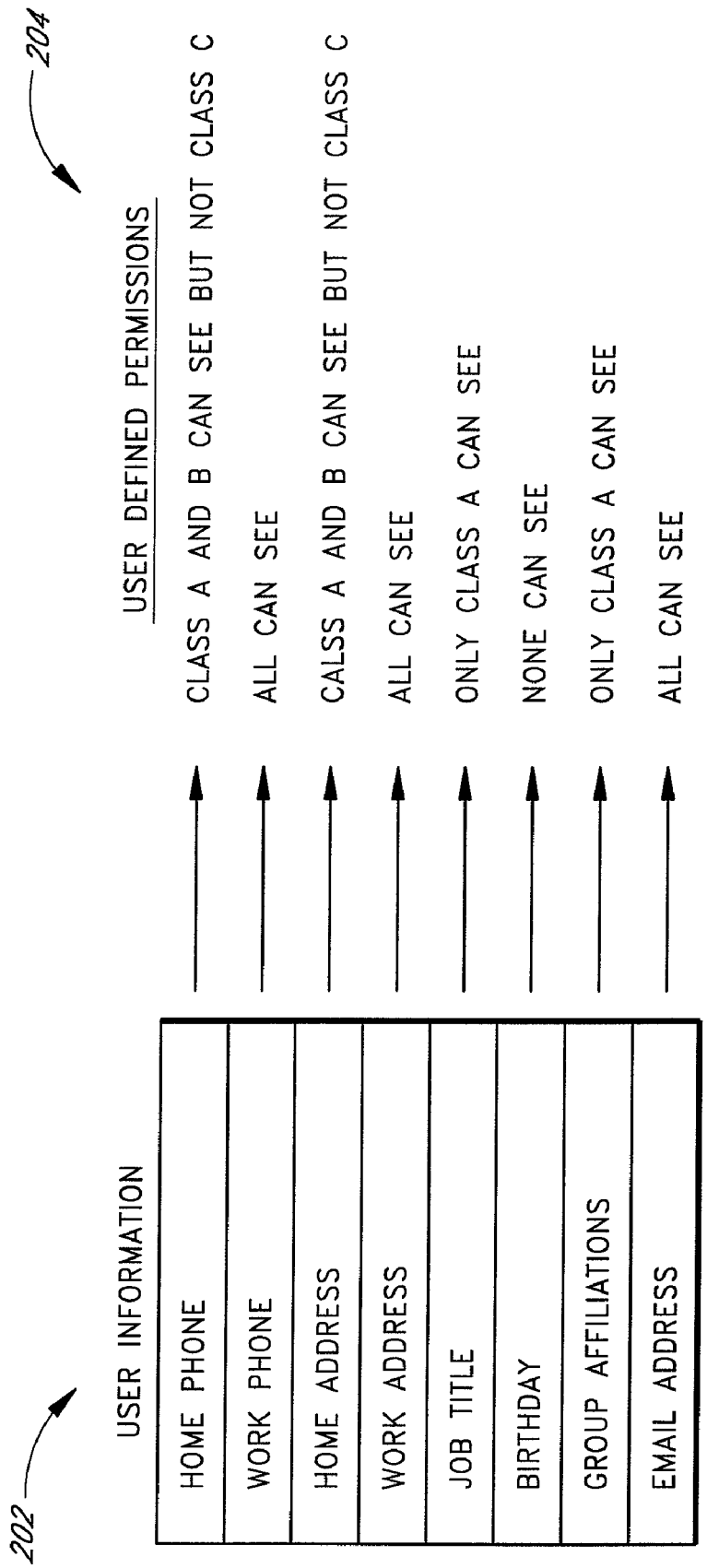
FIG. 3 shows a common scheme for authorizing permission to view information in the prior art.
Figure 4:
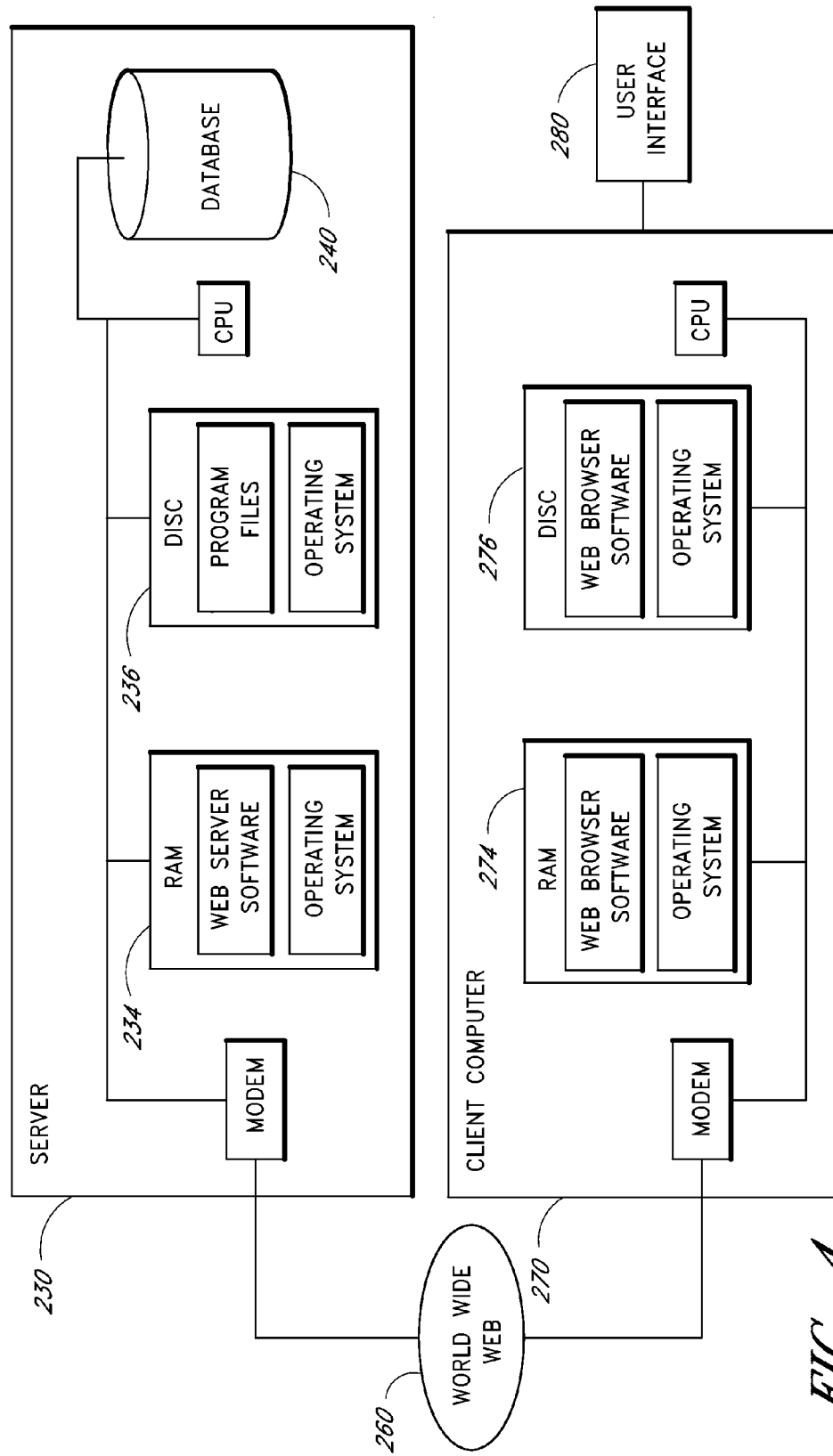
FIG. 4 depicts two computers interconnected via the Internet, one of which is a server connected to a database and the other of which represents a user's client workstation, both of which are configured according to the prior art.
Figure 5:
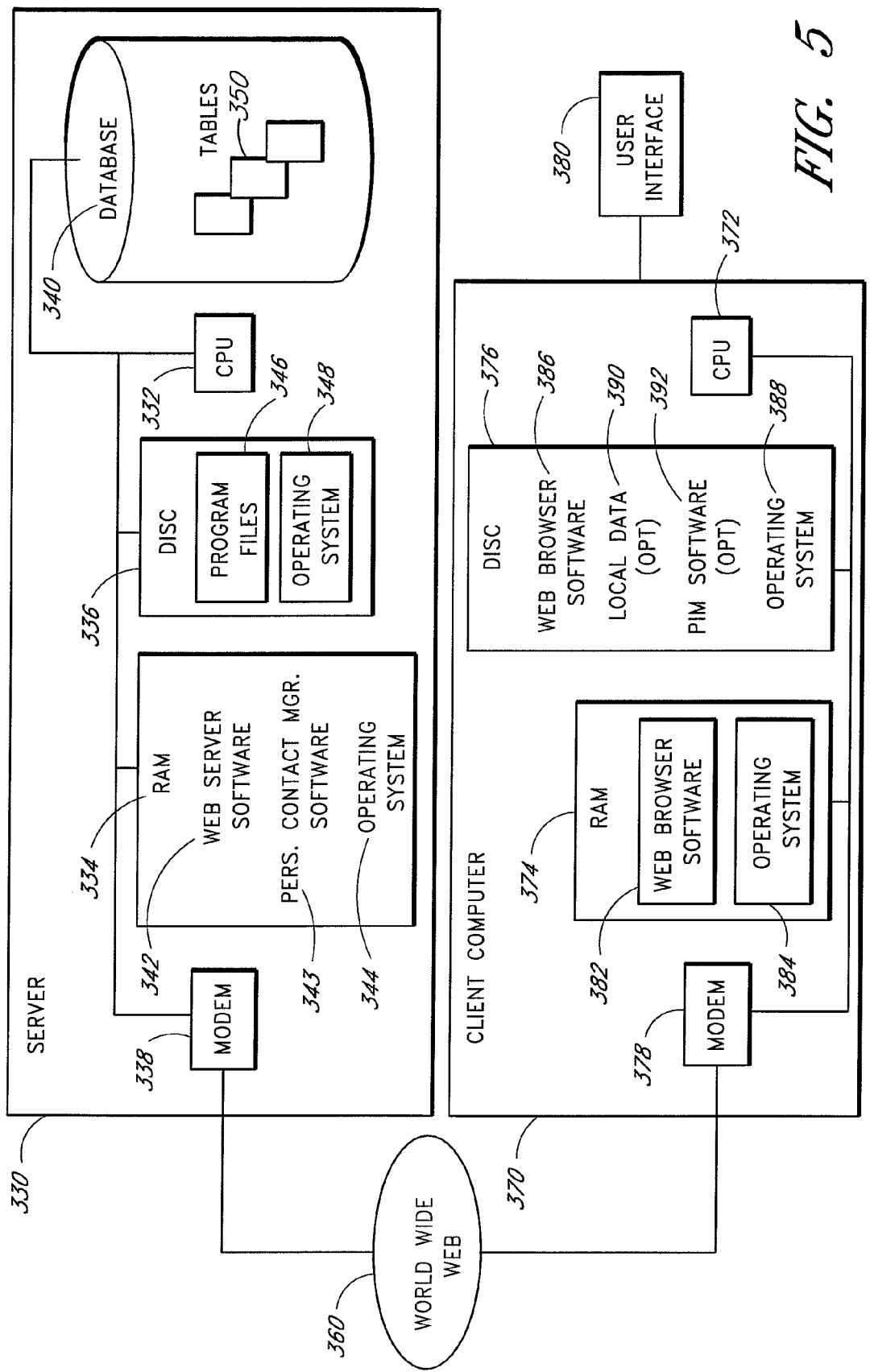
FIG. 5 depicts two computers interconnected via the Internet, one of which is a server connected to a database and the other of which represents a user's client workstation, both of which are configured according to the present invention.

As represented in FIG. 5, the preferred embodiment follows a standard Internet architecture, in which client computers 370 and a server computer 330 are connected via the World Wide Web 360 and modems 338, 378 or other communications channels. A user accesses the server 360 via a client computer 370 operating a web browser 382 or other software application residing in memory 374 that allows it to display information downloaded from a server computer 330. The server computer system 330 runs server software 342, including the network-computer-based personal contact manager 343 of the present invention, which interacts with the client computers 370 and a user information database 340. In a commercial embodiment of the present invention, the personal contact manager 343 is the heart of a Web-based personal contact management service called PlanetAll. The database 340 contains contact information entered by registered users. The personal contact manager 343 in some situations will notify a set of users of updates made to the database 340 by another user to whom the notified set is related.

The database 340 in is a relational database built from a set of relational tables 350. In the conventional manner, both the server 330 and the clients 370 include respective storage devices, such as hard disks 336 and 376 and operate under the control of operating systems 344, 384 executed in RAM 334, 374 by the CPUs 332, 372. The server storage device 336 stores program files 346 and the operating system 348. Similarly, the client storage devices 376 store the web browser software 386 and the operating systems 388. In an alternative configuration, in which the client is a personal information manager (PIM), such as the U.S. Robotics Palm Pilot, the disc 376 can also include a local PIM database 390 and PIM software, which performs data management and synchronization functions.

Figure 6:
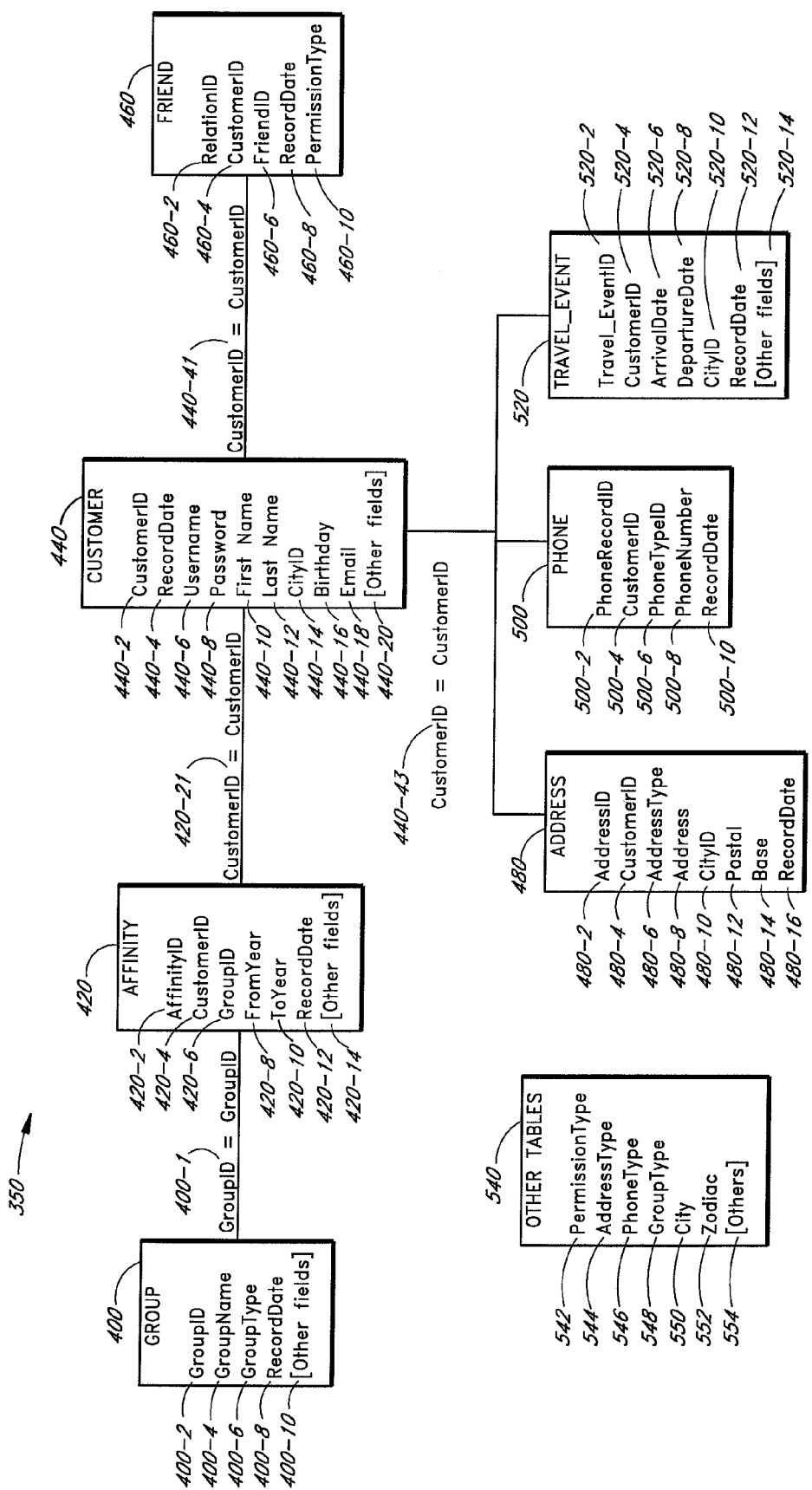
FIG. 6 represents an object model of the key tables in the relational database maintained on the server computer in the preferred embodiment of the present invention.

FIG. 6 outlines the data structure of the relational database 340 in the preferred embodiment, in which seven tables 350 are employed to enable most of the functionality of the system:

(1) Customer Table 440;
(2) Friend Table 460;
(3) Group Table 400;
(4) Affinity Table 420;
(5) Address Table 480;
(6) Phone Table 500; and
(7) Travel Event Table 520;

The Customer Table 440 contains one record for each unique user. The key field in this table is CustomerID 440-2. All information stored in the various database tables relating to a particular member is linked together by a unique number in this field. Other important fields in this table include information used by users to login to the system (Username 440-6 and Password 440-8), information which helps users identify each other (First Name 440-10, Last Name 440-12, and E-mail 440-20), information required to provide Birthday Notification (Birthday 440-16) and information required to provide Crossing Paths notification (CityID 440-14). Each record in the Customer Table 440 is time-stamped via the RecordDate field 440-4. Other fields 440-22 can also be included in the Customer Table 440 (and the other tables as well).

The Friend Table 460 relates users to each other. Each record in the table represents a relationship between one user, identified by CustomerID 460-4, and another, identified by FriendID 460-6, with a certain level of permissions 460-10. The user interface of the system provides a multitude of ways for users to view information about other users, and every one of these ways relies on a database query of the Friend Table 460 to determine the list of other users whose information a particular user may see. Each record is time-stamped via the RecordDate field 460-8 so that users may be notified when their contacts' records change. Each record is uniquely identified by a RelationID 460-2.

The Group Table 400 contains one record for each unique group with which users may affiliate. Each group is identified by a GroupName 400-4 and GroupType 400-6. Examples of these groups would be GroupName 400-4="Massachusetts Institute of Technology" (GroupType="University") and GroupName 400-4="Sigma Chi" (GroupType="Fraternity"). Each record has a time-stamp 400-8 and a unique identifier 400-2.

Each record of the Affinity Table 420 relates a user, identified by CustomerID 420-4, to a group, identified by GroupID 420-6. If a user affiliates with six groups, there would be six records in the Affinity Table 420. This table stores information about the time period of a user's affiliation with a particular group in the FromYear and ToYear fields 420-8, 420-10 so that the system may help users find their contemporaries. Each record is time-stamped 420-12 so that the system may report to users when other users join the group, has a unique identifier 420-2 and can include additional fields 420-14.

The Address Table 480 stores information for any number and kind of addresses for a particular user, identified by CustomerID 480-4. For instance, if a user wants to make his home address, work address and summer home address available to his contacts, there would be three records for that user in the Address Table 480, each being identified in part by an appropriate AddressType 480-8 (e.g., home, work, summer home). Each record is time-stamped 480-16 so that the system can notify users when their contacts have added or modified address information and has a unique identifier 480-2. Address information is conventional, including street Address 480-8, CityID 480-10, Postal code 480-12, and military Base 480-14 fields.

The Phone Table 500 is directly analogous to the Address Table 480, but it stores telephone and fax number information instead of address information. Each record is identified by a unique PhoneRecordID 500-2 and includes the CustomerID 500-4 of the user whose phone information is contained in the record, a phone type ID 500-6 indicating, e.g., whether the record is for a telephone or fax, the phone number 500-8 and a time-stamp 500-10.

The Travel Event Table 520 stores information about users' travel plans. This table is required to notify users when their travel plans intersect with the travel plans of their contacts. A record in the Travel Event Table 520 includes the CustomerID 520-4 of the user whose travel information is contained in the record, arrival and departure dates 520-6, 520-8 and a CityID 520-10 identifying the travel destination. Each record is uniquely identified by a Travel_EventID 520-2 and is time-stamped with a RecordDate 520-14.

In the preferred embodiment, a multitude of other tables 540 are used to enable a variety of user services. The Permission Type Table 542 contains one record for each of the varieties of permission levels the system allows members to assign to their contacts in the Friend Table 460. In the preferred embodiment, as illustrated in FIG. 9, permission information is grouped into five categories for the purpose of user interface simplicity (crossing paths notification permission 600-6, personal information 600-8, work information 600-10, birthday notification 600-12, and friends of friends information 600-14). However, the Permission Type table 542 could just as easily be structured to allow members to grant and deny access to information on a field by field basis.

The City Table 550 stores latitude and longitude information for two million cities to enable the system to notify users when their contacts travel within a defined geographical radius. The Zodiac Table 552 allows the system to associate birthdays with signs of the Zodiac and thereby notify which of their contacts have compatible astrological signs on a particular day. The AddressType, PhoneType and GroupType tables 544, 546, 548 define the types of address, phone and group that can be defined in the respective Address, Group and Phone tables 480, 400, 500. The advantage of this normalized relational database architecture is that it permits scaling and speed far in excess of any embodiment of the prior art.

FIGS. 7 through 12 display pseudo software graphical user interfaces (GUIs). In the preferred embodiment, the web server software 342 on the server computer 330 displays these GUIs via the computer communications interface 360 on the user interface 380 of the user workstation computer 370. The database and communications operations necessary to perform the described functions are controlled by the personal contact manager 343, which employs where necessary the services of the web server software 342. For example, the personal contact manager 343 updates the database tables 350 when a user submits a new home address and then determines whether any of that user's contacts need to be notified of the change. If so, the personal contact manager 343 will issue the notifications via the web server software 342. It should be assumed, unless a statement to the contrary is made, that all of the operations described herein which are aspects of the present invention are embodied by the personal contact manager 343.

Referring now to FIG. 7, a pseudo GUI 560 is shown that allows members to enter information about themselves in order to create a personal data record. Users can enter information in this GUI in various data fields. In the preferred embodiment, these fields include: Name 560-2, Home Address 560-4, Home Phone 560-6, Work Address 560-8, Work Phone 560-10, Birthday 560-12, High School 560-14, Year of High School Enrollment 560-16, High School Graduation Year 560-18, College 560-20, Year of College Enrollment 560-22, and College Graduation Year 560-24.

In certain of these data fields, the user can specify groups with which he wishes to affiliate himself, and the beginning and ending dates of the affiliation. In the preferred embodiment, the data fields High School 560-14 and College 560-20 represent categories of groups. In the data field Year of High School Enrollment 560-16, the user enters the beginning date of the affiliation with the group specified in the data field High School 560-14. In the data field High School Graduation Year 560-18, the user enters the ending date of the affiliation with the group specified in the data field High School 560-14. In the data field Year of College Enrollment 560-22, the user enters the beginning date of the affiliation with the group specified in the data field College 560-20. In the data field College Graduation Year 560-24, the user enters the ending date of the affiliation with the group specified in the data field College 560-20. In both of these cases, the beginning date and ending date establish a date range during which time the user was affiliated with the group in question.

Once the user of the client computer 370 (FIG. 5) enters information in each data field in the GUI 560 shown in FIG. 7, he clicks the Submit button 560-26 (or performs some equivalent action) and the information entered is transferred via the computer communications network 360 (FIG. 5) to the server computer 330, where the server personal contact manager software 343 stores the information in the appropriate tables 350 of a database 340.

Referring now to FIG. 8, a pseudo GUI 580 is shown that allows a first user to select other users they wish to add to their personal address book. The list of contacts is created based on the group affiliation information the first user enters in the data fields College 560-20, Year of College Enrollment 560-22, and College Year of Graduation 560-24 in the Pseudo Registration GUI 560 shown in FIG. 7. A similar GUI 580 would exist for the group specified in the data field High School 560-14 in the pseudo 560 GUI shown in FIG. 7.

In each version of the GUI 580 shown in FIG. 8, a text description 580-2 at the top of the GUI explains to the first user that other members have been found who had the same affiliation as the first user during the same period of time as the first user. The name 580-6 of the group in which the first and second users share an affiliation is displayed and the date range 580-8 of the first user's affiliation with that group is displayed.

If a second user whose personal information is stored in the tables 350 of the database 340 on the server computer 330 has specified the same group affiliation as that specified by the first user in the College 560-20 data field, and that second user has specified a date range for that affiliation that intersects with the date range specified by the first user in the Year of College Enrollment 560-22 and College Graduation Year 560-24 data fields, the Name 580-10 of the second user and the ending date 580-12 of the second user's affiliation with that group are displayed.

A second text description 580-4 at the top of the GUI 580 instructs the first user to select any of the second users listed whom the first user wishes to add to his personal address book. If the first user wishes to add a second user to his personal address book, the first user clicks the checkbox 580-14 to the left of the Name 580-10 (e.g., "John Doe") for that second user. Once the first user has finished specifying the users he wants to add to his address book, he clicks the Submit button 580-16, and the information entered is transferred via the computer communications network 360 to the server computer 330 where it is stored in the appropriate tables 350 of the database 340.

A pseudocode description of the actions performed by the personal contact manager software 343 to display the group member list is shown in Appendix A. This pseudocode fragment (and the others that follow) is written in a structured English that is similar to computer languages such as Pascal, FORTRAN and C. The pseudocode fragments are not described herein as they are self-explanatory. The tables and fields referred to in the pseudocode fragments correspond to the tables and fields described in reference to FIG. 6.

Referring now to FIG. 9, a pseudo GUI 600 is shown allowing a first user to specify which types of data fields from the first user's personal data record to grant a specific second user permission to view. If a first user specifies a second user whom the first user would like to add to his personal address book, as explained in the description of FIG. 8, the second user will receive notification (issued by the contact manager program 343—FIG. 5) that the first user has "linked" to him. If the second user chooses to return the link to the first user, the system will display the pseudo GUI 600 shown in FIG. 9 with the name of the first user 600-5, allowing the second user to set data field permissions for the first user. Unlike the prior art, which does not allow the first user to specify data field permissions for individual other users, the disclosed system allows the first user to specify permissions separately for each individual other user in whose personal database the first user has chosen to be included.

A text description 600-2 at the top of the pseudo GUI in FIG. 9 instructs the first user to specify which types of data fields from the first user's personal data record to allow to appear in the personal address book of the second user, whose name 600-4 is shown below. Several types of data field permission are listed, each with a check box to the left enabling the first user to select or deselect the permission type. For example, to grant the second user 600-4 permission to view the information from the first user's personal data record indicated by the permission type denoted "Crossing Paths Notification Permission," the first user would check the box 600-7 to the left of the permission type Crossing Paths Notification Permission 600-6. To deny the second user 600-4 permission to view the information from the first user's personal data record indicated by the permission type denoted "Personal Information," the first user would uncheck the box 600-9 to the left of the permission type Personal Information 600-8.

In the preferred embodiment of the present invention, the levels of permission are as follows: Crossing Paths Notification Permission 600-6, Personal Information 600-8, Work Information 600-10, Birthday Notification 600-12, and Friends of Friends Information 600-14. However, the present invention is not limited to the levels of permission shown in the preferred embodiment. The present invention is flexible to allow permission categories to be modified as needed.

Each permission type allows the second user to view information from the first user's personal data record in specific data fields, according to a specific set of rules. In the preferred embodiment of the present invention, these permission rules are as follows:

If member A links to member B, member A can grant any of the permissions discussed below to member B.

Even if member B does not reciprocate the link to member A, an e-mail forwarding address for member B will be included in the Virtual Address Book for member A. For example, the e-mail address "memberB@planetall.com," which maps to the actual e-mail address that member B has entered into his/her own record, will appear in member A's Virtual Address Book, but nothing else.

When member A first links to member B, member B is notified on the Web site and in an e-mail.

If member B elects not to grant any permissions to member A, member A will not appear in member B's Virtual Address Book.

If member B grants any permissions to member A, a listing in member B's Virtual Address Book will be created for member A, and the listing will contain whatever information member A has given permission for member B to see.

If member B grants Personal Information 600-8 permission to member A, member B's home address and phone number (if available) will appear in member A's Virtual Address Book and member A will be informed when member B changes the relevant information in his/her own listing.

If member B grants Work Information 600-10 permission to member A, member B's work address and phone number (if available) will appear in member A's Virtual Address Book and member A will be informed when member B changes the relevant information in his/her own listing.

If member B grants Crossing Paths Notification Permission 600-6 to member A, member A will be able to be informed when member B will be in the same city as member A. If member A and member B are both based in the same city, member A will only be informed when member A and member B are traveling to the same destination.

If member B grants Birthday Notification 600-12 permission to member A, member B's birthday and anniversary (if available) will appear in member A's Virtual Address Book and member A will be notified when member B's birthday or anniversary are approaching.

If member B grants Friends of Friends Information 600-14 permission to member A, if member A searches for information about the contacts of his/her contacts, such as who lives in a particular city or is associated with a particular group, information from member B's circle of contacts will be included in the search results, if applicable.

Either member can modify permissions at any time. Either member can delete the other member as a contact at any time.

Pseudocode descriptions of the actions performed by the personal contact manager software 343 to display address information of contacts and to perform birthday and address change notifications are shown in Appendices B, C and D, respectively. Each of these operations depends on which permissions respective users have been granted by the owner of the information.

Once the first user has finished specifying the data field permissions for the second user 600-4, he clicks the Submit button 600-16 and the information entered is transferred via the computer communications network 360 to the server computer 330 where it is stored in the appropriate tables 350 of the database 340 (see FIG. 5). A pseudocode description of the actions performed by the personal contact manager software 343 to enable a user to change the permissions of contacts is shown in Appendix H.

Figure 10:
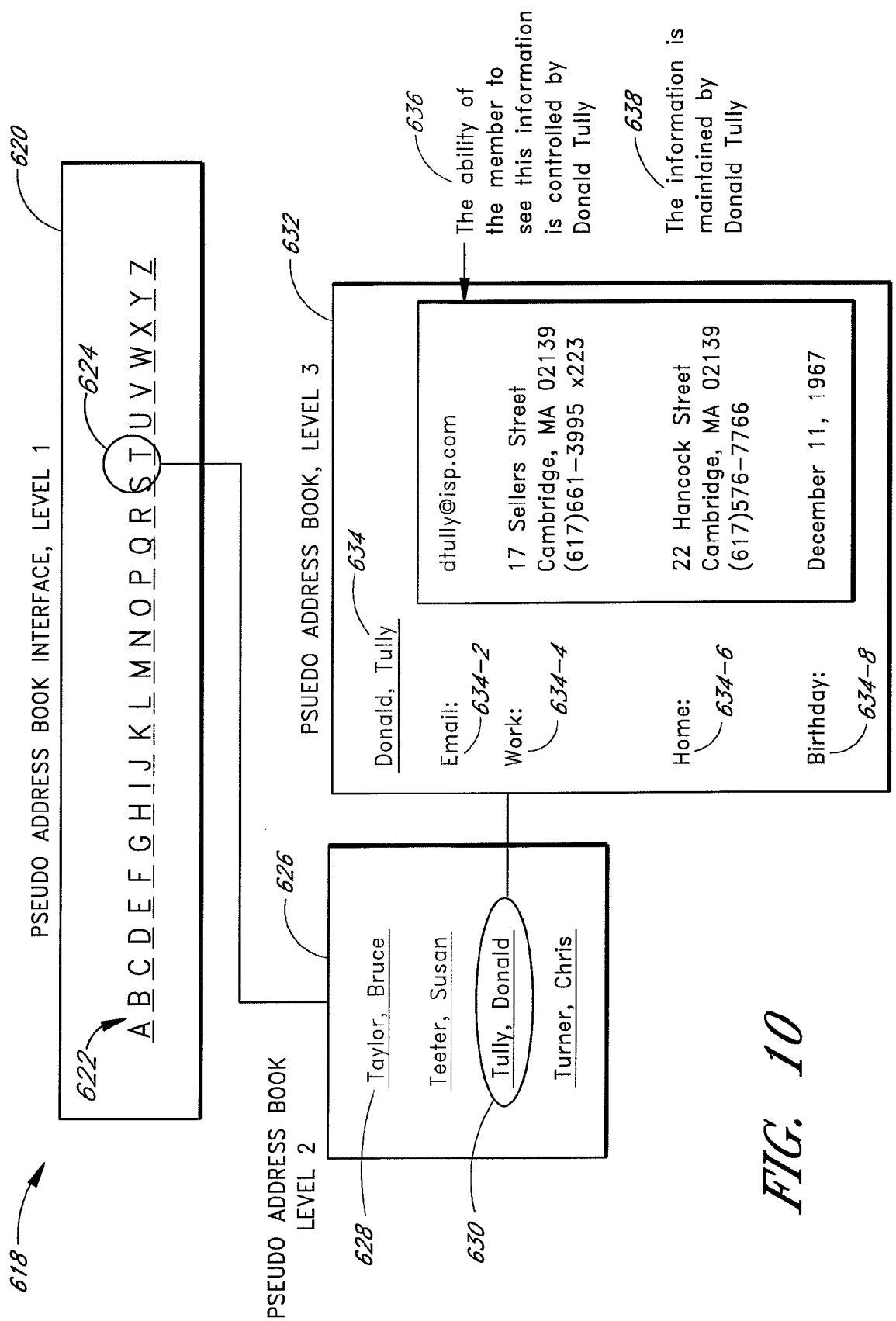
FIG. 10 represents a pseudo graphical user interface that displays the information stored in a user's personal address book.

Referring now to FIG. 10, a pseudo GUI 618 that displays the information stored in a user's personal address book is shown. The information in a user's personal address book is stored in the appropriate tables 350 of the database 340 on the server computer 330, to which the client computer 370 is connected via the world wide web 360 (see FIG. 5). The information in each user's personal address book is customized for that user, as described below. Each first user's personal address book contains information about each second user who has given the first user permission to view information in the second user's personal data record 636. Which categories of each second user's information are displayed in the first user's personal address book is controlled completely by the second user, as explained in the description of FIG. 9. In addition, each second user's information is entered and maintained completely by the second user (e.g., "Donald Tully"), as explained in the description of FIG. 7.

FIG. 10 illustrates the Address Book pseudo GUI 620 at three levels, in which each next level allows the user to view progressively more detail about the contacts in his personal address book.

In level 1 620 of the pseudo address book GUI 618, each letter of the alphabet is shown 622. By clicking on any letter of the alphabet 622, a first user can display a listing of the contacts whose last names begin with the letter of the alphabet selected, and about whom information is stored in the first user's personal address book. This information is displayed in the level 2 626 of the pseudo address book GUI. For example, if the first user clicks on the letter ⬜T⬜ 624 in level 1 620 of the pseudo address book interface, all contacts whose last names begin with the letter T and about whom information is stored in the first user's personal address book will be displayed 628 in level 2 626 of the pseudo address book GUI.

In level 2 626 of the pseudo address book GUI, a listing of the second users whose last names begin with the letter of the alphabet selected in level 1 620 of the pseudo address book GUI, and about whom information is stored in the first user's personal address book, is shown. By clicking on any second user's name, the first user can display the information about that second user stored in the first user's personal address book. This information is displayed in level 3 632 of the pseudo personal address book GUI. For example, if the first user clicks on the second user name "Tully, Donald" 630, the information pertaining to Donald Tully stored in the first user's personal address book will be displayed in level 3 632 of the pseudo address book GUI.

In level 3 632 of the pseudo address book GUI, information 634 is shown about a specific second user that is stored in a first personal address book. Only the categories of information from the second user's personal data record that the second user gave the first user permission to view are displayed. The second user's information is entered and maintained completely by the second user.

In the preferred embodiment of the present invention, the second user's e-mail address 634-2 is displayed if the second user gave the first user any type of data field permission. The second user's work address and phone number 634-4 are displayed only if the second user gave the first user Work Information permission. The second user's home address and phone number 634-6 are displayed only if the second user gave the first user Personal Information permission. The second user's birthday and birth year 634-8 are displayed only if the second user gave the first user Birthday Notification permission. These permission rules are simply examples from the preferred embodiment. The present invention is not limited to the permission rules used in the preferred embodiment.

A pseudocode description of the actions performed by the personal contact manager software 343 to display the address book listing is shown in Appendix B.

Referring now to FIG. 11, a member update pseudo GUI 650 is shown. This pseudo GUI 650 provides a first user with specific information that has changed about the other users to which the first user is linked, plus new information about contacts to whom the first user may wish to link. The information displayed in a user's member update is stored in the appropriate tables 350 of the database 340 on the server computer 330, to which the client computer 370 is connected via the world wide web 360. The member update pseudo GUI 650 is automatically displayed on the user interface 380 of the user workstation 370, at an interval preset by the user. For example, FIG. 11 displays a hypothetical member update 650-2 released on Dec. 7, 1998. The information displayed in the data fields below is information that has changed between Dec. 7, 1998 and the date of the previous update, the interval between which has been previously specified by the user. The information shown in each user's member update is customized for that user, as described below.

In a first portion of the member update pseudo GUI 650 shown in FIG. 11, if one or more of the second users who have linked to a first user and have provided Birthday Notification permission to the first user have upcoming birthdays, a text description 650-4 alerts the first user of the upcoming birthday(s). The names and birthdays 650-6 for those second users are listed below. In the preferred embodiment of the present invention, the first user will receive this notification 2 weeks, 1 week, 2 days, and 1 day in advance of a particular upcoming birthday, and on the actual date of the birthday. The first user does not need to collect and input the birthday dates for each second user who has linked to the first user. Each second user's birthday information is entered and maintained completely by the second user, as shown in the Birthday field 560-12 of FIG. 7, the registration form pseudo GUI 560.

In another portion of the member update pseudo GUI shown in FIG. 11, if one or more of the second users who have linked to the first user and have provided Personal Information permission or Work Information permission to the first user have changed their work or home address, a text description 650-8 alerts the first user. If a second user has changed his work address information and has given the first user Work Information permission, the second user's new work address information 650-10, 650-12 is displayed. If a second user has changed his home address information and has given the first user Personal Information permission, the second user's new home address information is displayed.

Each second user's address information is entered and maintained completely by the second user, as shown in the registration form pseudo GUI 560 of FIG. 7. After changing his address information in his personal data record, the second user does not need to specify that the new address information be provided to each first user to whom he has linked and given the proper form of data field permission. The new address information is provided to each first user quickly and automatically. In addition, the architecture of the present invention is scalable to include millions of users.

In another portion of the member update pseudo GUI 650 shown in FIG. 11, if one or more members has affiliated with a group with which the first user is also affiliated, a text description 650-14 will alert the first user. The name of the second user, the name of the group in which the first and second users share an affiliation, and the ending date of the second user's affiliation with that group are displayed 650-16.

This portion of the registration form pseudo GUI 650 functions similarly to the group list form pseudo GUI shown in FIG. 8. If a new second user who fills out a registration form such as the pseudo GUI in FIG. 7, and therefore whose personal information is stored in the tables 350 of the database 340 on the server computer 330 has specified the same group affiliation as that specified by the first user in the College 560-20 data field, and that second user has specified a date range for that affiliation that intersects with the date range specified by the first user in the Year of College Enrollment 560-22 and College Graduation Year 560-24 data fields, the Name of the second user and the ending date of the second user's affiliation with that group 650-16 are displayed. Similarly, if the first user and the new second user were affiliated during an intersecting period of time with the group specified in the data field High School 560-14 in the pseudo GUI 560 shown in FIG. 7, the Name of the second user and the ending date of the second user's affiliation with that group 650-16 are displayed.

A pseudocode description of the actions performed by the personal contact manager software 343 to display a list of service members who have recently joined a user's groups (i.e., members who are not current contacts of the user) is shown in Appendix E.

If the first user wishes to add contact information to his personal address book for any of the second users listed 650-16, the first user can do so in a GUI similar to the group list form pseudo GUI 580 shown in FIG. 8. Each second user to whom the first user has initiated a link will then be informed of the link, and can then return the link and specify data field permissions for the first user, if any, as explained in the description of FIG. 9.

A pseudocode description of the actions performed by the personal contact manager software 343 to identify people who have linked to a particular user are shown in Appendix F.

In another portion of the member update pseudo GUI 650 shown in FIG. 11, if a second user has initiated a link to a first user, the first user will be automatically notified 650-18 that a link has been made. For each second user that has initiated a link, the user's name 650-20 is shown. If the first user wishes, the first user can then return the link and specify data field permissions for the second user, if any, as explained in the description of FIG. 9.

Another section 650-22 of the member update pseudo GUI 650 shown in FIG. 11 is used to inform a first user when the travel plans he has entered into the system overlap with the travel plans that any of his contacts has entered into the system, as long as the contact has granted the first user Crossing Paths Notification permission.

This system, termed "Crossing Paths Notification" in the preferred embodiment of the present invention, operates as follows. The home city or "base city" for each user is determined from information entered by that user in the Home Address data field 560-4, as explained in the description of FIG. 7. The "City" table 550 (FIG. 6) stored on the server computer 330 includes 1.7 million names of cities around the world. Each of these cities is associated with a precise latitude and longitude. If the user's base city cannot be matched to a city in the "City" table, the user can add the new city to the "City" table by giving the name of another city that is already in the "City" table that is nearby the user's base city. The user's base city is assigned the same latitude and longitude as the existing city. This information is used to associate each user with a precise longitude and latitude, and determine all cities within a 29-mile radius of the user's base city.

Whenever a user is planning to travel, he can specify the dates during which he will be away and the city he will be visiting. If a second user has granted a first user Crossing Paths Notification permission, and the first user has entered a Travel Event to a city that is within a 29-mile radius of the base city of the second user, the first user will be notified 650-22 (FIG. 11) that he will be crossing paths with the second user 650-24 (e.g., "Andrew Kress"), as long as the second user has not also scheduled a travel event for the same time period. In another scenario, if a second user has granted a first user Crossing Paths Notification permission, and the first user has entered a travel event to a city that is within a 25-mile radius of a city to which the second user has scheduled a travel event during the same time period, the first user will be notified 650-22 that he will be crossing paths with the second user 650-24. Travel events are described more fully in reference to FIG. 12.

The Crossing Paths Notification system is able to handle multiple cities in a single day. For instance, if a first user lives in Boston but is traveling to New York on March 5, then the first user will be informed if any contacts will be crossing paths on that day in either city. In addition, this system is scalable to millions of users. A pseudocode description of the actions performed by the personal contact manager software 343 to enable a user to receive crossing paths notification is shown in Appendix I.

The final section 650-26 of the member update pseudo GUI 650 shown in FIG. 11 is used to inform a first user which of his contacts has an astrological sign compatible with that of the first user on the date of the member update. Each member is associated with one of the twelve astrological signs based on the information he entered in the Birthday data field 560-12 in the registration form pseudo GUI 560 shown in FIG. 7. Each day of the year is mapped to one of these twelve signs. This information is stored in the appropriate table 350 in the database 340 on the server computer 330. On a given day, all of a member's contacts who are associated with "sign of the day" are deemed to be compatible with the member. Only the names of contacts who have given the first user Birthday Notification permission will be shown in the member update pseudo GUI for the first user. A pseudocode description of the actions performed by the personal contact manager software 343 to enable a user to receive notification of compatible contacts is shown in Appendix J.

The permission rules used in reference to FIG. 11 are simply examples from the preferred embodiment. The present invention is not limited to the permission rules used in the preferred embodiment.

Referring now to FIG. 12, a pseudo Add Travel Form GUI 660 and a pseudo Crossing Paths List GUI 670 are shown. These two screens are used in the Crossing Paths Notification System. If a first member is planning a trip, the first member can use the pseudo Add Travel Form GUI 660 to add a Travel Event, in which he specifies the location 660-2, 660-4, 660-6, dates 660-8, 660-10, and contact information 660-20 for the intended trip. In the pseudo Crossing Paths List GUI 670, the first member is informed which of the second members to whom he is linked and who have granted him Crossing Paths Permission will be in the vicinity of the city to which the first user is travelling, during the time period of the specified Travel Event. The first user can then use the pseudo Crossing Paths List GUI 670 to select which of the displayed second users the first user would like to inform of the first user's specified Travel Event.

The pseudo Add Travel Form 660 is displayed on the user interface 380 (FIG. 5) of a user's client computer 370 when the user chooses to schedule a Travel Event. The user enters information about his scheduled trip in the data fields shown. In the Traveling To City field 660-2, the user enters the name of the city to which he is traveling. In the State field 660-4, the user enters the name of the state in which is located the city to which he is traveling. In the Country 660-6 field, the user enters the name of the country in which the city to which he is traveling is located. The information entered in these three fields 660-2, 660-4, 660-6 is used to locate the city for the Travel Event in the City table 550 on the server computer 330. The exact latitude and longitude of the Travel Event city is then determined and a list is created of all cities located within a 25-mile radius of the Travel Event city. In the Arrive in City on Date field 660-8, the user enters the first date on which he will be in the Travel Event city. In the Leave City on Date field 660-10, the user enters the date beginning on which he will no longer be in the Travel Event city. The information entered in these two fields 660-8, 660-10 is used to determine the date range for the Travel Event. Finally, in the How to Get in Touch While in This City data field 660-20, the user enters the method for contacting him during the Travel Event. After the user has finished entering information in the pseudo Add Travel Form GUI (12-1), the information entered is stored by the personal contact manager 343 in the Travel_Event table 520 on the server computer 330.

The pseudo Crossing Paths List 670 is displayed on the user interface 380 of the first user's client computer 370 after a first user has scheduled a Travel Event using the pseudo Add Travel Form 660. A text message 670-2 issued by the personal contact manager 330 informs the first user that one or more of his contacts will be in the same city as the first user during the first user's scheduled Travel Event. Those contacts (e.g., Scott Ulem, Taylor Pierce, Betsy Klein) who live in the city of the first user's scheduled Travel Event are listed 670-6, as well as those contacts (e.g., Tania Gutsche) who will be visiting the city of the first user's scheduled Travel Event 670-8. The contacts listed in the field 670-6 are those second users who have granted the first user Crossing Paths Permission, and who have listed in the Home Address field 560-4 (FIG. 7) of their Personal Data Record the city of the first user's scheduled Travel Event, or any city within a 25-mile radius of the first user's scheduled Travel Event. The contacts listed in the field 670-8 are those second users who have granted the first user Crossing Paths Permission, and who have scheduled a Travel Event to the city of the first user's scheduled Travel Event, or any city within a 25-mile radius of the first user's scheduled Travel Event, during the date range of the first user's scheduled Travel Event. For each contact name listed in both fields 670-6, 670-8, the first user can choose to inform that contact of the first user's scheduled Travel Event by clicking on the checkbox to the left of that contacts name. When the first user is finished selecting contacts, he then clicks the Submit button 670-10, which copies the information entered to the server computer (5-45) to be stored in the tables 350 by the networked personal contact manager 343. For each second user whom the first user selected, the second user is informed, in a screen similar to the pseudo Member Update GUI shown in FIG. 11, of the first user's Travel Event and the means of contacting the first user 660-20 during the Travel Event.

Figure 13:
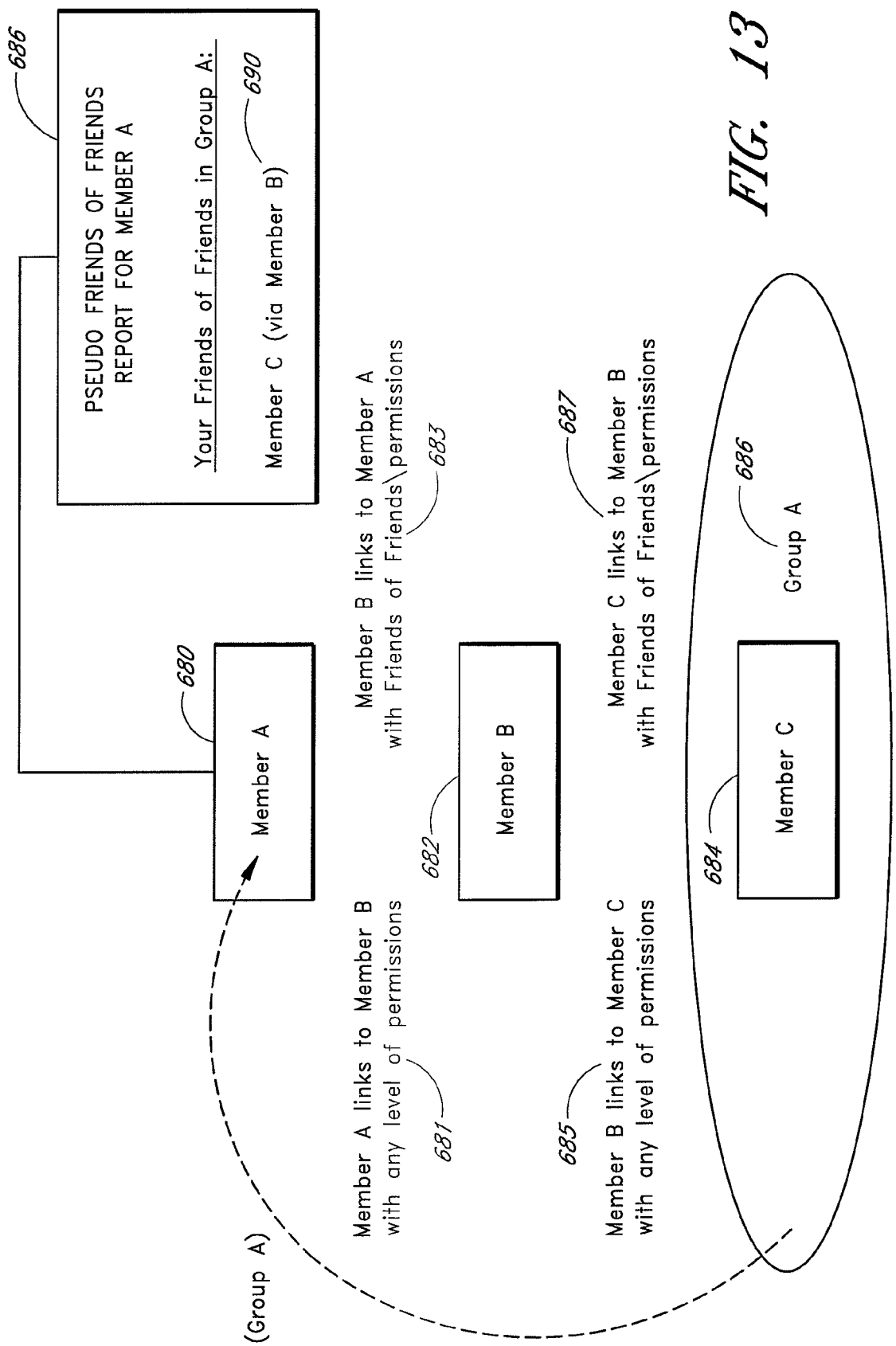
FIG. 13 represents a pseudo graphical user interface that allows a first user to gather information about the contacts of his contacts.

Referring now to FIG. 13, a diagram illustrating the Friends of Friends system is shown. The Friends of Friends system allows a first member to search for the names of contacts of their contacts who live in the same city as the first member or are affiliated with a group with which the first member is also affiliated. When a first user performs a Friends of Friends search, the personal contact manager 343 displays, via the web server software 342, the results of the search on the user interface 380 (FIG. 5) of the first user's client computer 370 in a GUI similar to the pseudo Friends of Friends report GUI 688. After locating a second member who is a friend of a friend, the first member can then link to that second member in order to add the second member to the first user's Personal Address Book, as explained in the descriptions of FIG. 8 and FIG. 9 above.

In the preferred embodiment of the personal contact manager 343, the Friends of Friends system operates as follows. If a Member A 680 is linked to a Member B 682 with any level of permissions 681 and the Member B 682 is linked to a Member C 684 with any level of permissions 685, then if Member C 684 grants to Member B 682 Friends of Friends permissions 687 and Member B 682 also grants to Member A 680 Friends of Friends permissions 683, then Member A is eligible to receive Friends of Friends notification about Member C. When a first user performs a Friends of Friends search, the results of the search will include all second users who have affiliated themselves with a group with which the first user is affiliated and all second users who live in the same city in which the first user lives, so long as the first user is eligible to receive Friends of Friends notification about those second users, as described above. For example, if Member A and Member C both belong to Group A 686, and Member A is eligible to receive Friends of Friends notification about Member C, then the result of Member A's Friends of Friends search 688 generated by the personal contact manager 343 will include Member C 690.

A pseudocode description of the actions performed by the personal contact manager software 343 to perform a search for friends and friends of friends in a specific city is shown in Appendix G.

The present invention is not limited to the search criteria or levels of separation in the preferred embodiment. The database architecture in the present invention is flexible to allow searches to be extended to more than one degree of separation. For instance, it would be possible to add a Friends of Friends of Friends search feature. The architecture is also flexible to allow new search criteria to be added.

Referring to FIG. 5, in each of the embodiments described above, the user information is stored on the server 330 and all user access to the user information is mediated by a client web browser 382, the web server software 342 and the server personal contact manager software 343. In an alternative embodiment, which is configured for personal information managers (PIMs), such as the U.S. Robotics Palm Pilot, a user is able to synchronize their user information and their PIM database 390 through an importation/synchronization function performed by the personal contact manager software 343. The synchronization operation can be performed in either direction (i.e., client to server or server to client). The server personal contact manager software 343 will then use the web server software 342 to communicate with the PIM software 392 of the user's contacts, if applicable, and, in accordance with the permission scheme already described, synchronize the databases 390 in the contacts' PIMs. All database, personal contact management and linking operations already described are operable in the alternative embodiment, except the GUIs might be different, depending on the graphical capabilities of the client 370 running the PIM program 392. Thus, the alternative embodiment allows full synchronization of PIMs and the server database 340.

Figure 14:
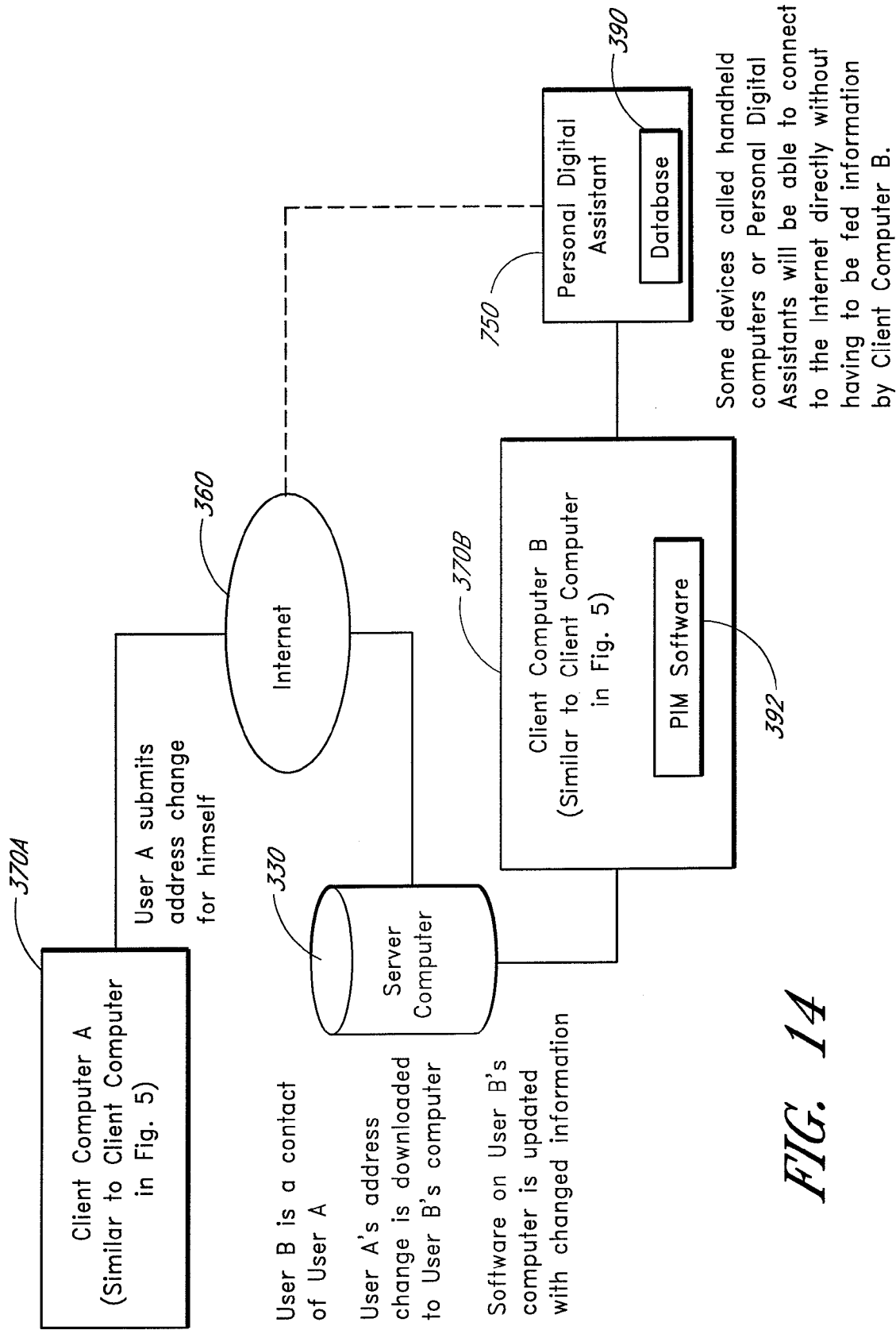
FIG. 14 is a data flow diagram of an alternative embodiment of the present invention where a personal digital assistant is synchronized with a server database of user information.

A data flow diagram illustrating the operation of the alternative embodiment is shown in FIG. 14. In the illustrated situation a user A submits an address change from their client computer 370A. In response to the update, the personal contact manager 343 running on the server 330 updates user A's address information in the server database 340 (not shown) and issues an update notification to the client computer 370B used by user B, who is a contact of user A. This alternative embodiment assumes that user B has a PIM (also referred to as a personal digital assistant or PDA) that they would like to synchronize with the server database 340. In such a case PIM Software 392 running on the client 370B performs the synchronization operation based on the user A address update information provided by the server 330. Following the synchronization operation, the PDA database 390 has the same information for user A as the server database 340. Alternatively, the PDA 750 can be coupled directly to the Internet (indicated by the dashed line), in which case it operates substantially as a typical client computer 370 described in reference to FIG. 5. However, one difference is that the PDA 750 maintains its own database 390 instead of relying solely on the server database 340.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

Appendix A

Display Group Member List

Submit group name.
Match group name to GroupID in Group table.
Join Affinity table to Customer table and CustomerPrefs table based on CustomerID.
Show contact information from Customer and CustomerPrefs tables when the the Affinity table contains a record matching the CustomerID to the specified GroupID.

Appendix B

Display Address Book Listing

```
If MemberFriend AND a Reciprocated Link then
        If have Personal or Professional Permissions then
                Show person's real email address.
        else
                Show person's PlanetAll address.
        end if
        If have Personal Permission and Biography Exists then
                Show Biography.
        end if
        If (have Personal or Professional Permissions) AND universal resource locator
(URL) exists then
                Show URL.
        end if
        If (Person is visible in group and Group Perms > 0) AND you have Common
Groups then
                Show the groups you have in common.
        end if
        If Person is in one of more of your personal email lists then
                Show the lists the person belongs to.
        end if
        If have Personal Permissions and Phone Type is one of personal phone types
then
                Show phone.
        end if
        If have Professional Permissions and phone type is one of professional phone
types then
                Show phone.
        end if
        If have Personal Permissions and address Type is one of personal address types
then
                Show address.
                if address is in USA then
                        Show map link.
                end if
        end if
        If have Professional Permissions and address type is one of professional address
types then
                Show address.
                if address is in USA then
```

```
            Show map link.
        end if
    end if
    If have Professional Permissions and Professional Info Exists then
        Show the professional info the person has entered.
    end if
    If have Occasions Permissions and Birthday exists then
        Show the contact's birthday.
    end if
        If have Occasions Permissions and Anniversary exists then
            Show the contact's Anniversary.
        end if
        If contact has entered spouse's name then
            Show spouse's name.
        end if
        If contact has entered self description then
            Show self description.
        end if
    else if MemberFriend AND a Non-Reciprocated Link then
        Show message person has not linked back and give link so person can
        email the unlinked person to tell them they have linked to them. (after
        com/ASP rewrite will not show email so spammers can't make lists).
    end if
```

Appendix C

Birthday Notification

Birthdays are determined by the DayOfYear field in the customers table.

Create a list of all my contacts:

Go to the Friend table and select all Customers where FriendID=my CustomerID.

For each of my contacts, check to see if the DayOfYear is within seven days of the current DayOfYear.

Select the DayOfYear from the Customers table for all of the customers in my list of contacts.

If the DayOfYear is within seven days of the current DayOfYear, then select the name of the customer.

Display the names of all my contacts who have birthdays in the next seven days.

Appendix D

Address Change Notification

To determine which of a member's contacts' addresses have changed:

Create a list of all my contacts:

Go to the Friend table and select all Customers where FriendID=my CustomerID.

Find out which of these contacts have changed their addresses:

Link the Customers table and find records for my contacts where AddressID is greater than the lowest Address ID having a date greater than the date on which my last email update was sent.

Find out which of these contacts have given me permission to see the address information that has changed:

Make sure that the appropriate permission appears in the record in the friend table linking me to the contact.

Display information for these contacts.

Appendix E

Show New Group Members

Create a list of all my groups:
Go to the affinity table and select all the records for my CustomerID Select the GroupID for each of the records.
Do not include other customers' private groups to which I have been added For each of my affinity records, check to see that Group Perms are >0.
Create a list of all my contacts:
Go to the Friend table and select all Customers where FriendID=my CustomerID.
Create a list of people who joined my groups:
Go to the affinity table and select all the affinity records for my groups.
Select only affinity records for customers who joined the group after I joined.
    Select affinity records where the date of the record is after the date for my affinity record in the same group.
    Select only affinity records for people who joined the groups after my last email was sent.
    Select affinity records where the date of the record is after my Sent date in the Email table.
Do not include people that are in my list of contacts:
    Select only affinity records where the CustomerID is not included in the list of all my contacts.
Select the CustomerID from each affinity record in the list of people who joined my groups.
Go to the Customers table to find the name of each customer who joined my groups.

Appendix F

People Who Have Linked To You

Linking the Friends table and the Customers table based on the CustomerID field, select the following information from the two tables:
CustomerID from the Friends table.
First Name from the Customers table.
Last Name from the Customers table.

Record Date from the Friends table.

Permission level from the Friends table.

Where my CustomerID is not among the CustomerIDs found in the following search:

CustomerID in the Friends Table is my CustomerID

AND the Record Date from the Friends table is within the last 30 days

AND I haven't already linked to the person

Appendix G

Search for Friends of Friends in a Particular City

Specify City. Match to CityID in City table.

Create a list of all my contacts

Go to the Friend table and select all Customers where FriendID=my CustomerID

Make a temporary table linking the Friends table to itself called Friend_1 and establish the following relationships:

CustomerIDs for the contacts of my contacts appear in the Customer field of the Friends table CustomerIDs for my contacts appear in the Friend field of the Friends table CustomerIDs for my contacts also appear in the Customer field of the Friends_1 table (this is how the tables are joined)

My Customer ID appears in the Friend field of the Friend_1 table

The Friend and Friend_1 tables are joined on t

Show information for the contacts of my contacts (i.e. the Customers from the Friends table) where the following conditions are true:

The Friends of Friends permission was granted from the contacts of my contacts to my contacts.

The Friends of Friends permission was granted from my contacts to me.

The contact does not already appear in the list of all my contact created above.

The city for the contact of my contact matches the specified city.

Appendix H

Change Permissions

Join the Customer table to the Friend table based on CustomerID.

Create a list of all my contacts:

Go to the Friend table and select all Customers where FriendID=my CustomerID.

Show First Name and Last Name for my contacts from the Customer table.

Allow me to pick a name from this list as the contact whose permissions I would like to change.

Display the permission level that I have given this contact. It is stored as the PermissionType field in the Friend table.

Allow access to the PermissionType for this record in the Friend table.

Appendix I

Crossing Paths Notification

Create a list of all my contacts:
Go to the Friend table and select all Customers where FriendID=my CustomerID.
Create a list of all my contacts' travel events:
Go to the Queue Travel Event table and select all QueueIds where the CustomerID is in my list of contacts.
Do not include trips for people who linked to me but did not give me crossing paths permission:
Check the permissions field in the Friend table for each of my contacts to see if I have crossing paths permissions.
Do not include trips if my contact specified that I should not be informed:
For each of my contacts' trips, check the Travel Exception table to see if my CustomerID is included in the list of people who should not be informed of the trip.
Create a list of my location for the next seven days:
Select the arrival date, departure date, and city for all my trips in Queue Travel Event for the next seven days.
For days when I am not traveling, select my city from the customers table.
Select from the list of my friends' trips, all the trips to cities that are within 3000 latitude and 3000 longitude to my location for each of the next seven days.
Go to the Customers table and find the names of all the people with whom I will be crossing paths.
Select first name and last name from the customers table for all the CustomerIDs in the list of my contacts trips Appendix J Compatible Contacts Create a list of all my contacts:
Go to the Friend table and select all Customers where FriendID=my CustomerID.
Determine my Zodiac sign:
Select my DayOfYear from the Customers table.
Select the Zodiac sign from the Zodiac table where my DayOfYear is between the DayFrom and DayTo fields.
Determine my compatible Zodiac sign for today:
Go to the Horoscope table and select the Compatible field from the row for my Zodiac sign and today's date.
Find my compatible contacts for today:
Select the DayFrom and DayTo fields from the Zodiac table for my compatible zodiac sign.
Select my contacts from the list of all my contacts whose DayOfYear is between the DayFrom and DayTo fields for my compatible sign.

What is claimed is:

1. A computer-implemented method, comprising:

receiving and storing personal data of a first user of a computer-based service, said computer-based service accessible to users over a network, said personal data specified by the first user;

providing a user interface for users to establish contact relationships with other users of the service such that each user can have one or more contacts, said user interface enabling a user to identify other users of the service, and to selectively initiate the generation of requests to establish contact relationships with the identified users;

receiving a request from a second user of the service to establish a contact relationship with the first user, said request submitted to the service over a network via said user interface;

sending a notification of the request to the first user over a network;

providing an option, in connection with said request, for the first user to grant permission for the second user to view at least some of the personal data of the first user; and in response to the first user granting said permission, providing the second user access to at least some of the personal data of the first user via a contact information user interface of the service, such that the second user is provided access to data that would not otherwise be accessible to the second user via the service;

wherein the method, including receiving and storing the personal data, providing the user interface, receiving the request, sending the notification, providing said option, and providing the second user access, is performed by a server computer system.

2. The method of claim 1, wherein notifying the first user of the request comprises sending a notification to the first user by email.

3. The method of claim 1, wherein the personal data comprises multiple data elements, each corresponding to a different type of personal data, and the method comprises providing an option for the first user to designate a subset of said data elements to be exposed to the second user by the service.

4. The method of claim 1, further comprising providing an option for the first user to take an action that causes the service to expose to the second user information regarding who is a contact of the first user.

5. The method of claim 1, further comprising, in connection with said contact relationship, exposing to the second user, via a user interface of the service, contact relationships between the first user and additional users.

6. The method of claim 1, further comprising providing a web-based personal address book for the first user based on contact relationships established between the first user and other users of the service, said web-based personal address book providing access to contact information maintained by each contact of the first user.

7. The method of claim 1, wherein the service maintains relationship data representing contact relationships between users, and the method further comprises using the relationship data to detect, and to cause the first user to be notified that, a third user is a contact of a contact of the first user via the second user.

8. The method of claim 1, wherein providing the first user an option to grant permission comprises providing an electronic form that includes multiple permission options that are selectable by the first user, each permission option corresponding to a particular type of personal data of the first user, whereby the first user can specify the types of personal data to be exposed to the second user by the service.

9. The method of claim 1, wherein the method comprises providing functionality for the first user to grant different permission levels to different contacts of the first user, such that some contacts of the first user are provided access to different types of personal data of the first user than others contacts of the first user.

10. The method of claim 1, wherein said option to grant permission is provided to the first user in response to the first user reciprocating the request to establish a contact relationship.

11. The method of claim 1, further comprising providing the second user an option, in connection with said contact relationship, to specify one or more types of personal information of the second user to be exposed to the first user by the service.

12. The method of claim 1, wherein the personal data of the first user comprises an identification of a school attended by the first user and an associated date range of attendance, and the method further comprises the server computer system using said personal data to identify, and inform the first user of, other users of the service who attended said school in said date range.

13. A computer system that provides a service to users over a network, said computer system comprising a processor and a memory, an being programmed, via executable program instructions, to perform a method that comprises:

receiving and storing personal data of a first user of the service, said personal data specified by the first user;

providing a user interface for users to establish contact relationships with other users of the service such that each user can have one or more contacts, said user interface enabling a user to identify other users of the service, and to selectively initiate generation of requests to establish contact relationships with the identified users;

receiving a request from a second user of the service to establish a contact relationship with the first user, said request submitted to the service over a network via said user interface;

sending a notification of the request to the first user over a network;

providing an option, in connection with said contact relationship, for the first user to grant permission for the second user to view at least some of the personal data of the first user; and in response to the first user granting said permission, providing the second user access to at least some of the personal data of the first user via a contact information user interface of the service, such that the second user is provided access to data that would not otherwise be accessible to the second user via the service.

14. The computer system of claim 13, wherein notifying the first user of the request comprises sending a notification to the first user by email.

15. The computer system of claim 13, wherein the personal data comprises multiple data elements, each corresponding to a different type of personal data, and the method comprises providing an option for the first user to designate a subset of said data elements to be exposed to the second user by the service.

16. The computer system of claim 13, wherein the computer system is additionally programmed to provide an option for the first user to take an action that causes the service to expose to the second user information regarding who is a contact of the first user.

17. The computer system of claim 13, wherein the computer system is additionally programmed to expose to the second user, in connection with said contact relationship, contact relationships between the first user and additional users.

18. The computer system of claim 13, wherein the computer system is additionally programmed to provide a web-based personal address book for the first user based on contact relationships established between the first user and other users of the service, said web-based personal address book providing access to contact information maintained by each respective contact of the first user.

19. The computer system of claim 13, wherein the computer system is programmed to maintain relationship data regarding contact relationships between users, and to use the relationship data to detect, and to cause the first user to be notified that, a third user is a contact of a contact of the first user via the second user.

20. The computer system of claim 13, wherein the computer system is programmed to provide to the first user an electronic form that includes multiple permission options that are individually selectable by the first user, each permission option corresponding to a particular type of personal data of the first user, whereby the first user can specify the types of personal data to be exposed to the second user.

21. The computer system of claim 13, wherein the computer system provides functionality for the first user to grant different permission levels to different contacts of the first user, such that some contacts of the first user are provided access to different types of personal data of the first user than other contacts of the first user.

22. The computer system of claim 13, wherein the computer system is programmed to provide said option to grant permission in response to the first user reciprocating the request to establish a contact relationship.

23. The computer system of claim 13, wherein the computer system is additionally programmed to provide the second user an option, in connection with said contact relationship, to specify one or more types of personal data of the second user to be exposed to the first user by the service.

24. The computer system of claim 13, wherein the personal data of the first user comprises an identification of a school attended by the first user and an associated date range of attendance, and the computer system is additionally programmed to use said personal data to identify, and to inform the first user of, other users of the service who attended said school in said date range.

25. The computer system of claim 13, wherein the personal data of the first user comprises an identification of an organization with which the first user was affiliated and an associated date range of affiliation, and the computer system is additionally programmed to use said personal data to identify, and to inform the first user of, other users of the service who were affiliated with the organization in said date range.

* * * * *